(12) United States Patent
Lease et al.

(10) Patent No.: US 10,175,088 B1
(45) Date of Patent: Jan. 8, 2019

(54) LIQUID LEVEL GAUGE WITH REMOVABLE INDICATOR ASSEMBLY

(71) Applicant: Texas LFP, LLC, Dallas, TX (US)

(72) Inventors: Benjamin Neal Lease, Flower Mound, TX (US); Herbert G. Ross, Jr., Argyle, TX (US); Robert E. Hrncir, Irving, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 15/934,049

(22) Filed: Mar. 23, 2018

Related U.S. Application Data

(63) Continuation-in-part of application No. 29/633,037, filed on Jan. 11, 2018, and a continuation-in-part of application No. 29/633,034, filed on Jan. 11, 2018.

(51) Int. Cl.

| | |
|---|---|
| *G01F 23/34* | (2006.01) |
| *G01F 23/38* | (2006.01) |
| *G01F 23/36* | (2006.01) |
| *G01D 11/24* | (2006.01) |
| *G01F 15/06* | (2006.01) |
| *G01F 23/00* | (2006.01) |

(52) U.S. Cl.
CPC ............ *G01F 23/34* (2013.01); *G01D 11/245* (2013.01); *G01F 15/063* (2013.01); *G01F 23/0061* (2013.01); *G01F 23/36* (2013.01); *G01F 23/38* (2013.01); *F17C 2250/0413* (2013.01)

(58) Field of Classification Search
CPC ........ G01F 23/32; G01F 23/34; G01F 23/366; G01F 23/263; G01F 23/38; B01D 41/02; B01J 49/85; B05B 7/24; B05B 7/2486; B08B 9/093; C02F 1/42; D06F 13/02; D06F 13/04; D06F 37/203; D06F 37/30
USPC .... 340/618, 626, 623, 624, 438, 450, 450.2, 340/450.3, 507, 547, 602, 632
See application file for complete search history.

(56) References Cited

U.S. PATENT DOCUMENTS

| | | | |
|---|---|---|---|
| 4,536,756 A * | 8/1985 | DePasquale | G08B 21/182 340/626 |
| 4,688,028 A | 8/1987 | Conn | |
| 5,305,639 A * | 4/1994 | Pontefract | G01F 23/54 200/84 C |
| 5,410,913 A | 5/1995 | Blackburn | |
| 6,041,650 A | 3/2000 | Swindler et al. | |
| 6,336,362 B1 | 1/2002 | Duenas | |

(Continued)

*Primary Examiner* — Daniel Previl
(74) *Attorney, Agent, or Firm* — Alvin R. Wirthlin

(57) ABSTRACT

An indicator assembly for determining a liquid level condition within a tank includes a dial assembly with a base and a lens or cover connected to the base. A channel is formed in the lens and a go-no-go protrusion projects into the channel. An actuator is located between the base and the cover and is movable in response to a change in liquid level in the tank. The indicator assembly also includes a sensor module for insertion into the channel. The sensor module has a housing with a sensor for determining movement of the actuator in response to a change in liquid level. A go-no-go cavity complementary in shape with the go-no-go protrusion is formed in the housing so that the sensor module can be fully inserted into the housing with the sensor aligned with the actuator for generating signals related to the liquid level condition.

15 Claims, 10 Drawing Sheets

(56) References Cited

U.S. PATENT DOCUMENTS

| | | | |
|---|---|---|---|
| 6,437,697 B1* | 8/2002 | Caro | ............... G01F 15/063 |
| | | | 116/204 |
| 6,564,632 B2 | 5/2003 | Ross, Jr. | |
| 6,679,116 B2 | 1/2004 | Ross, Jr. | |
| 6,742,396 B2 | 6/2004 | Schenk, Jr. | |
| 6,822,565 B2* | 11/2004 | Thomas | ............... G08B 21/182 |
| | | | 116/309 |
| 7,652,563 B2 | 1/2010 | Kuhnly et al. | |
| 7,690,323 B2 | 4/2010 | Ross, Jr. | |
| 8,604,934 B2 | 12/2013 | Ross, Jr. | |
| 2004/0238421 A1* | 12/2004 | Orillion | ............... A22C 29/023 |
| | | | 210/95 |
| 2009/0058666 A1 | 3/2009 | Clabaugh | |
| 2012/0068849 A1* | 3/2012 | Ross, Jr. | ............ G01F 23/32 |
| | | | 340/618 |
| 2015/0068301 A1* | 3/2015 | Ross, Jr. | ............ G01F 23/68 |
| | | | 73/313 |

* cited by examiner

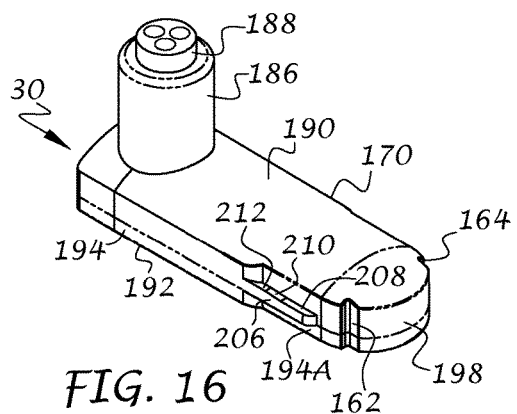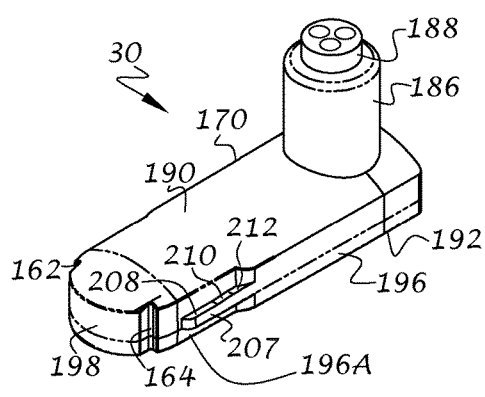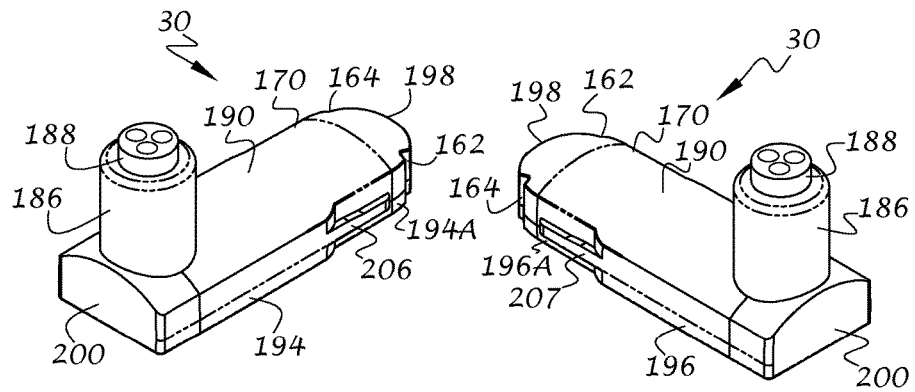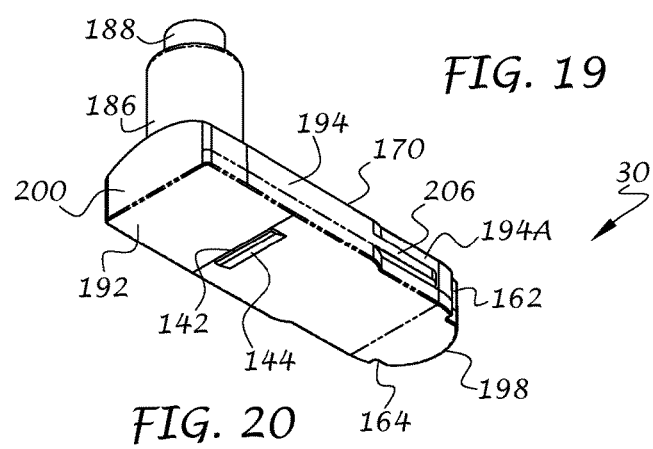

LIQUID LEVEL GAUGE WITH REMOVABLE INDICATOR ASSEMBLY

CROSS REFERENCE TO RELATED APPLICATIONS

This application is a continuation-in-part of U.S. Design application No. 29/633,034 filed on Jan. 11, 2018, and U.S. Design application No. 29/633,037 filed on Jan. 11, 2018, the disclosures of which are hereby incorporated by reference in their entirety.

BACKGROUND OF THE INVENTION

This invention relates to monitoring liquid level in tanks, and more particularly to a system and method for manually determining and electronically indicating a liquid level condition within a tank.

The determination of liquid level, such as the level of liquefied petroleum (LP) gas, propane, butane, and so on, in transportable and stationary storage tanks is often inconvenient for vehicle operators, will-call status customers and others where a mechanical gauge head and sending unit are installed in the tank. Such customers must visually read the gauge head to determine the liquid level condition of the tank, then call a fuel supply company for tank refill. For some portable tanks, such as those used to power forklifts, generators, and other equipment, the operator is usually not in a position to constantly monitor the fuel level since the gauge head is out of the operator's view. Accordingly, the equipment can run out of fuel at a location remote from the replacement tank, causing equipment downtime and loss of revenue, power, and other conditions until the empty tank can be replaced.

For stationary tanks, located at a place of residence or business for example, a person must exit the building, approach the tank and move a protective cover located over the gauge head and other fittings in order to ascertain whether or not a fuel supply company should be contacted for refilling the tank. Consequently, many stationary tanks also run out of fuel at the most inconvenient times, such as during heating, cooking, bathing, and so on. However, such inconveniences can potentially lead to more serious consequences, such as frozen pipes during winter conditions and the attendant damage and repair costs, health degradation when exposed to low temperature conditions, and so on. The difficulty in ascertaining fuel level within the tank is exacerbated when access to the gauge head is not possible for numerous reasons, such as the location of the gauge head, physical limitations of the user, and so on.

Portable and permanently installed storage tanks for pressurized fuel and other liquids, such as liquefied petroleum gas (LPG), propane, butane, and so on, typically include a fuel sending unit mounted at the center or end of the tank for view by an observer. The sending unit typically includes a float that rides on the surface of the liquid. The float is connected to a pivoting float arm which is in turn connected to the lower end of a driven shaft that rotates about its axis in response to float movement. A drive magnet is typically located at the upper end of the driven shaft that magnetically couples with a driven magnet inside the gauge head, which is associated with an indicator and gauge plate with scale markings thereon, so that rotational movement of the drive magnet in response to float movement induces the driven magnet to rotate a proportional amount and rotate the indicator across the scale, to thereby display a liquid level condition of the tank to an observer. One such device for determining liquid level within LPG or fuel oil tanks is disclosed in U.S. Pat. No. 6,041,650 to Swindler, et al., and includes a sensing probe having a movable float arm coupled by gears to the lower end of a rotatable drive shaft. A magnet is mounted to the upper end of the shaft and extends into a passage of a gauge head for magnetic coupling with a level indicating dial. A change in liquid level within the tank causes movement of the float arm and thus rotation of the indicating dial with respect to a stationary gauge plate with liquid level indicia printed thereon, to thereby show the amount of liquid within the tank. These types of liquid level gauges must be manually accessed and visually observed to determine the position of the indicating dial with respect to the gauge plate, and is often inconvenient to do so, as discussed above.

In order to facilitate the reading of liquid level, and due to the number of portable and stationary tanks with pre-existing sending units having a magnet at the top of a rotatable drive shaft inside the tank, a liquid level gauge, which allows both manual and electronic determination of the liquid level within the tank, is disclosed in U.S. Pat. No. 6,564,632 to Ross, Jr., the disclosure of which is hereby incorporated by reference. This patent discloses a gauge head for mounting to a tank and a dial assembly for mounting to the gauge head. The dial assembly includes a base, which is in turn connected to the gauge head. A magnetically-driven indicating dial, or pointer magnet, is rotatably mounted on the base above a stationary gauge plate also mounted on the base. The gauge plate includes scale indicia around its periphery relating to liquid level in the tank. The relative position of the magnetically-driven indicating dial and the gauge plate can be viewed by a user for manually determining liquid level within the tank. This gauge also enables electronic determination of the liquid level by the provision of a circular pointer magnet with a variable thickness. The pointer magnet rotates in response to the rotation of one or more tank magnets, as disclosed in the Swindler, et al. patent referenced above. The variable thickness of the pointer magnet creates a linearly variable magnetic flux around the periphery of the magnet. A transparent lens or cover is connected to the base for enclosing and protecting the components of the dial assembly. The transparent nature of the cover allows a user to view the indicating dial and gauge plate to visually ascertain the liquid level. A channel is formed in the cover for receiving a removable magnetic detector with a single Hall-effect sensor. The channel is located at a position to ensure that the pointer magnet and the gauge plate with liquid level indicia are not obfuscated, thereby allowing the simultaneous visual observation of the liquid level and electronic determination thereof by electronically sensing a change in the magnetic flux of the pointer magnet, and thus its angular position with respect to the magnetic detector. The angular position of the pointer magnet is indicative of liquid level in the tank. The electronic signal produced by the magnetic detector can be sent to a remote location for viewing by a user or further processing, notifying a distributor of LPG or the like of the liquid level condition within the tank for scheduling delivery of LPG, and so on.

Although the above-described system is adequate for manually and electronically indicating liquid level, the specially shaped pointer magnet with variable thickness is a specialty item that is relatively expensive to manufacture when compared to ordinary magnets, requires calibration, and thus increases manufacturing time and costs, thereby increasing the overall cost of the gauge head.

It would therefore be desirous to overcome one or more disadvantages of liquid level gauges associated with storage tanks as discussed above.

BRIEF SUMMARY OF THE INVENTION

According to one aspect of the invention, an indicator assembly for determining a liquid level condition within a tank includes a dial assembly adapted for connection to the tank. The dial assembly has a base; a cover connected to the base, the cover having a channel and at least one go-no-go protrusion projecting into the channel; and an actuator located between the base and the cover, the actuator being movable in response to a change in the liquid level condition in the tank. The indicator assembly also includes a sensor module adapted for insertion into the channel. The sensor module has a housing; at least one sensor located in the housing for determining movement of the actuator from one position to another in response to a change in liquid level within the tank; and at least one go-no-go cavity formed in the housing. The at least one go-no-go cavity is complementary in shape with the at least one go-no-go protrusion so that the sensor module can be fully inserted in the housing with the at least one sensor aligned with the actuator for generating signals related to the liquid level condition. In this manner, an unauthorized sensor module is not capable of being fully inserted into the housing due to the at least one go-no-go protuberance and the absence of the at least one go-no-go cavity in the unauthorized sensor module to thereby prevent the unauthorized sensor module from sending incorrect signals related to the liquid level condition.

Other aspects, objects and advantages of the invention will become apparent upon further study of the following description in conjunction with the attached drawings.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 16 is a top front right isometric view of the sensor module;

FIG. 17 is a top front left isometric view thereof;

FIG. 18 is a top rear right isometric view thereof;

FIG. 19 is a top rear left isometric view thereof; and

FIG. 20 is a bottom rear right isometric view thereof.

It is noted that the drawings are intended to depict only typical embodiments of the invention and therefore should not be considered as limiting the scope thereof. It is further noted that the drawings may not be necessarily to scale. The invention will now be described in greater detail with reference to the accompanying drawings.

DETAILED DESCRIPTION OF THE INVENTION

Figure 1:
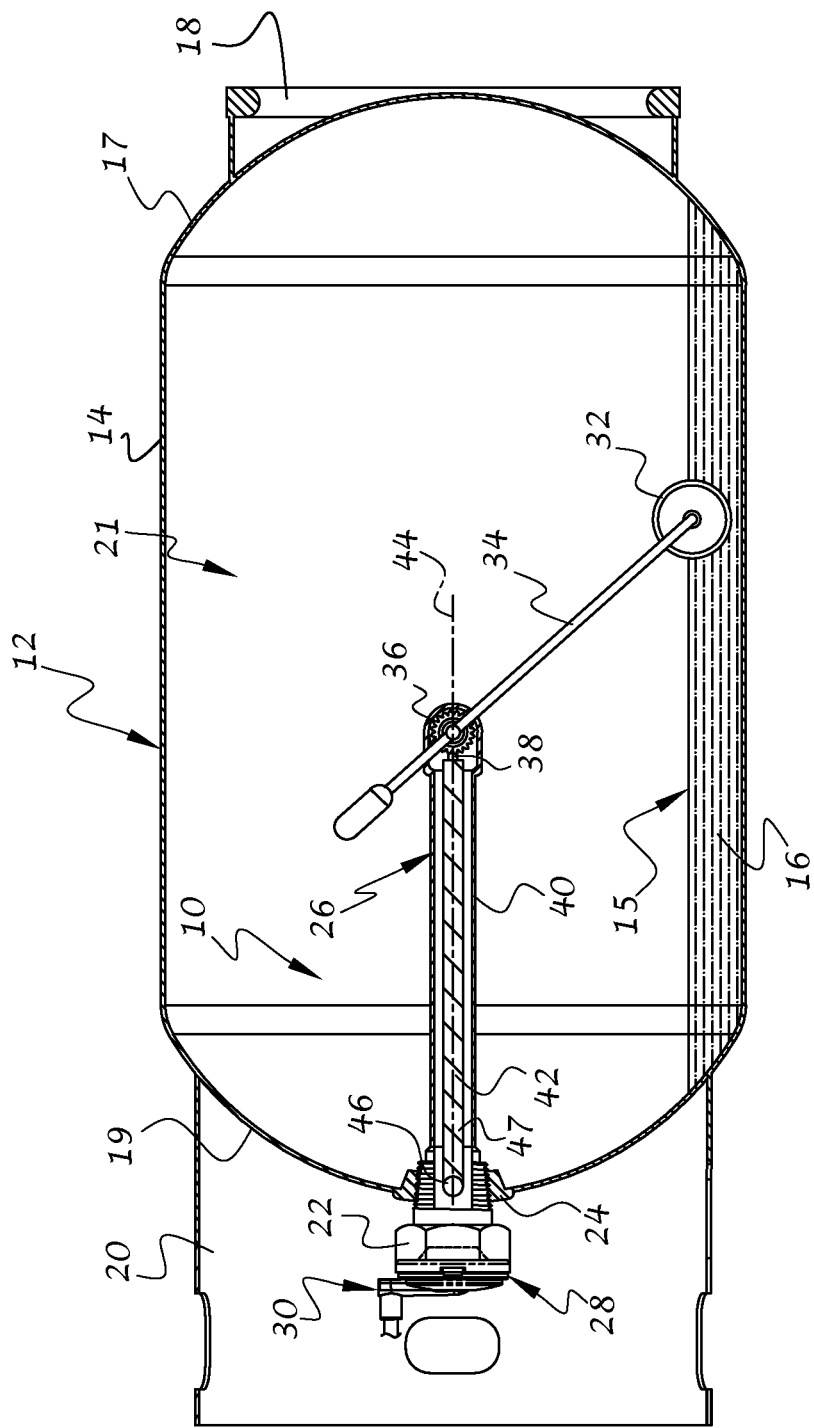
FIG. 1 is a schematic side view of a of a liquid level gauge in accordance with an exemplary embodiment of the invention connected to a tank for both visually displaying and electronically determining a liquid level condition within the tank.

Referring to the drawings, and to FIG. 1 in particular, a liquid level gauge 10 for both visually observing and remotely determining a liquid level condition within a container, such as tank 12, in accordance with a preferred embodiment of the invention is illustrated. In accordance with one exemplary embodiment of the invention, the liquid level gauge 10 is connected to a propane tank or LP gas cylinder 12 that may either be stationary or movable depending on the particular intended use of the tank. For example, the tank 12 may be removably mounted on a forklift, generator, and other equipment, or permanently mounted at a stationary location near a business or residence for example, permanently mounted on a fuel supply vehicle, and so on.

The tank 12 is of conventional construction and includes a pressure cylinder comprising a cylindrical wall 14 and semi-spherical end walls 17 and 19 connected to opposite ends of the cylindrical wall 14 to form a pressure-resistant hollow interior 21 for holding a quantity of propane and/or other liquids 16 that may be stored under pressure, as well as liquids that require no pressure. An annular base 18 can be provided and is located at one end of the tank 12 near the end wall 17 for orienting the cylinder in an upright position during use and/or storage. An annular wall or valve guard 20 can also be provided and is located at the opposite end of the tank 12 and surrounding the end wall 19. Although not shown, the tank 12 may include other components typically associated with propane tanks or other pressurized or non-pressurized tanks, such as a fill/supply valve, over-pressure safety valve, and so on. As will be appreciated, the present invention is applicable to any tank or container configuration where liquid is stored therein and removed therefrom, where it is desirous to remotely determine a liquid level condition.

The liquid level gauge 10 of the present invention preferably includes a mounting head 22 connected to the end wall 19 of the tank 12 via a reinforced tank mounting portion 24 that is welded or otherwise secured to the end wall 19. The mounting head 22 has external threads (not shown) and the reinforced mounting portion has corresponding internal threads (not shown) for securing the liquid level gauge 10 to the tank 12 in a well-known manner. It will be understood that other mounting arrangements can be provided for the tank 12 and/or liquid level gauge 10 without departing from the spirit and scope of the invention. For example, the mounting head may comprise a flange mounting arrangement with holes for fasteners extending through the flange as is well-known. Other means for mounting the liquid level gauge 10 to a tank or other container can be used, including NPT type threads, clamping, welding, and so on, without departing from the spirit and scope of the invention.

The liquid level gauge 10 further includes a sending unit 26 extending into the tank from one side of the mounting head 22, and a dial assembly 28 connected to the other side of the mounting head 22 outside of the tank 12. A removable sensor module 30 is operably associated with the dial assembly 28 for electronically determining a liquid level condition within the tank 12. Preferably, the sending unit 26 is isolated from the dial assembly 28 via the mounting head 22 so that the tank 12 is completely sealed when the mounting head 22 is installed. In this manner, the liquid level gauge 10 can be used in tanks under relatively high pressures, such as for measuring the level of LPG, propane, butane, and other cryogenic liquids stored under relatively high pressure within the tanks.

The sending unit 26 includes a float 32 connected to a pivot arm 34 which is in turn connected to a gear 36 rotatably mounted at a lower or distal end of a hollow support tube 40. The float rides along the surface or level 15 of the liquid 16 in the tank to cause rotation of the pivot arm 34 and gear 36. An upper or proximal end of the support tube 40 is connected to, and extends from, the mounting head 22 of the liquid level gauge 10 and into the tank 12. A spur gear 38 meshes with the gear 36 and causes rotation of a drive shaft 42 about its central axis 44 upon float movement. The drive shaft 42 extends coaxially through the support tube 40 and in turn rotates one or more drive magnets 46 connected to an upper or proximal end 47 of the drive shaft 42 within the mounting head 22 of the liquid level gauge 10.

The dial assembly 28 is preferably attached to the mounting head 22 and is magnetically driven by the rotating drive magnet(s) 46 to thereby indicate the level 15 of liquid 16 in the tank 12, as will be described in greater detail below. Further details of the mounting head 22 and sending unit 26 can be found in U.S. Pat. No. 6,041,650 issued on Mar. 28, 2000 to Swindler et al., the disclosure of which is hereby incorporated by reference. It will be understood that other types of sending units and mounting arrangements can be used without departing from the spirit and scope of the present invention.

Figure 2:
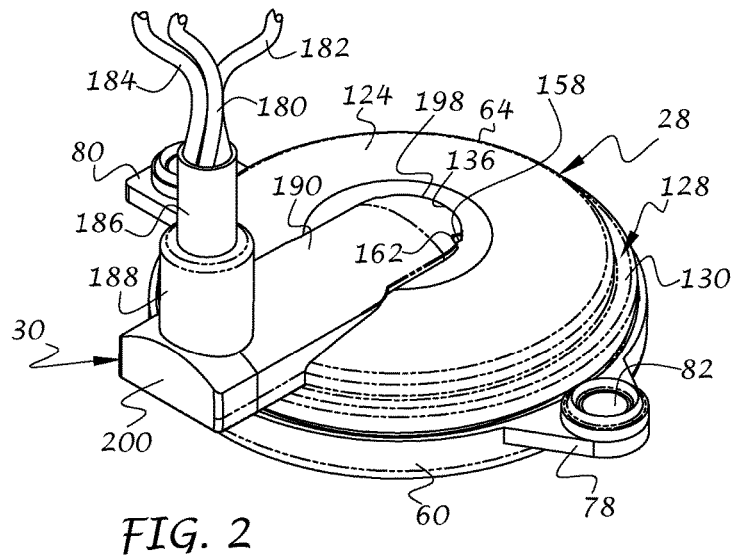
FIG. 2 is a rear isometric view of a dial assembly and connected sensor module that forms part of the liquid level gauge in accordance with the invention.
Figure 3:
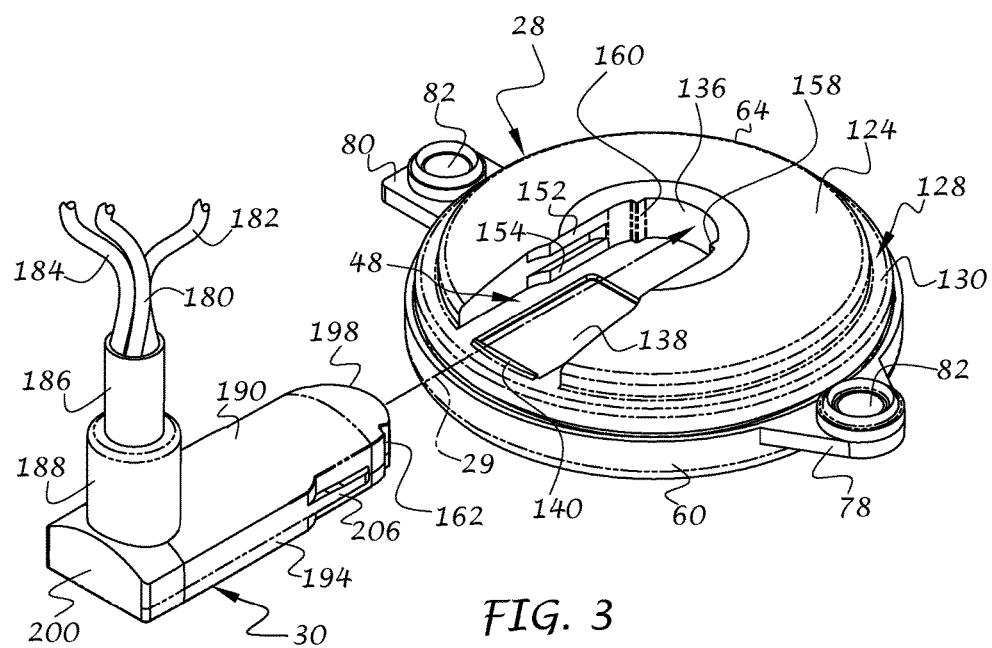
FIG. 3 is a rear isometric view of the dial assembly of FIG. 2 showing removal and installation of the sensor module.
Figure 4:
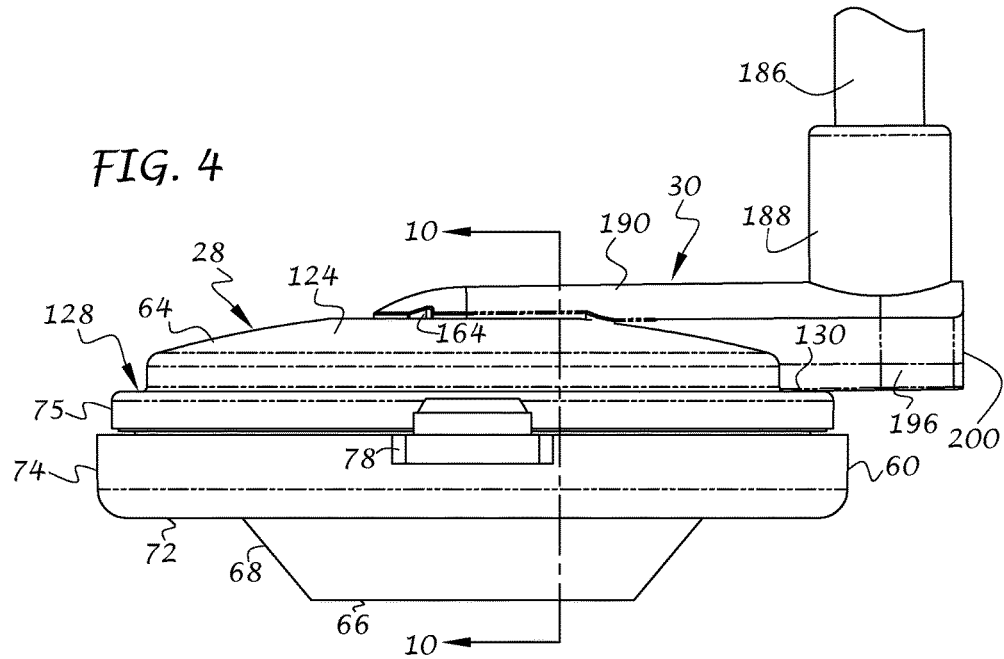
FIG. 4 is a left side elevational view of the dial assembly and connected sensor module.
Figure 5:
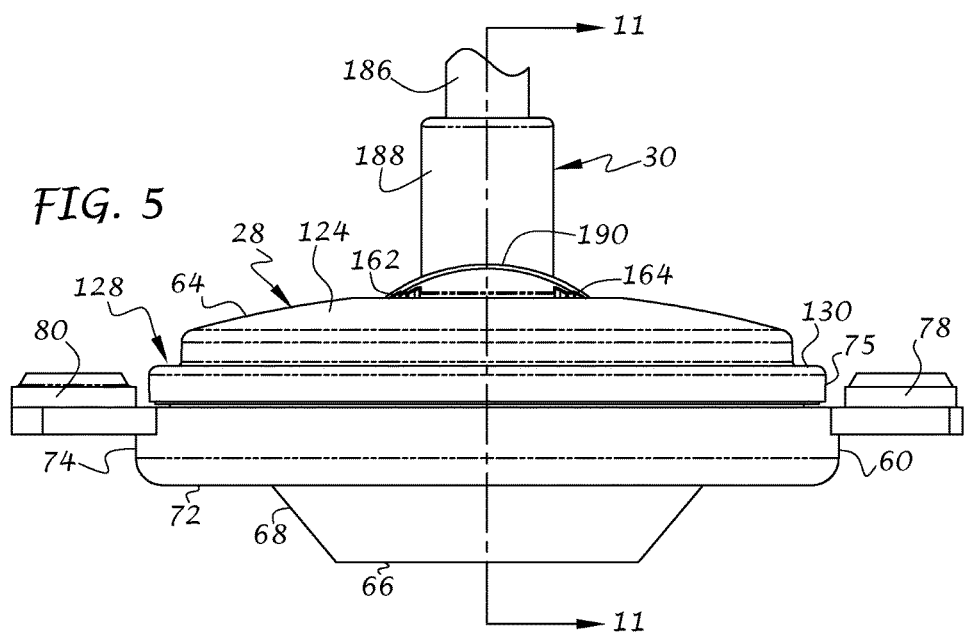
FIG. 5 is a front elevational view thereof.

Referring now to FIGS. 2 to 5, enlarged views of the dial assembly 28 and removable sensor module 30 are shown. In FIG. 2, the sensor module 30 is received in the dial assembly 28 for electronically detecting the level of liquid 16 (FIG. 1) in the tank 12. In FIG. 3, the sensor module 30 is removed from the dial assembly 28 and ready to be installed, as represented by arrow 29, exposing a channel 48 formed in the dial assembly that complements the shape of the sensor module 30. In this manner, the sensor module 30 is received in the channel 48, preferably in a snap-fit engagement, as will be discussed in greater detail below. In FIGS. 4-5, enlarged elevational side and front views, respectively, of the dial assembly 28 and connected sensor module 30 are shown. In this position, the dial assembly and sensor module are locked together for electronically determining the level of liquid within the tank.

Figure 6:
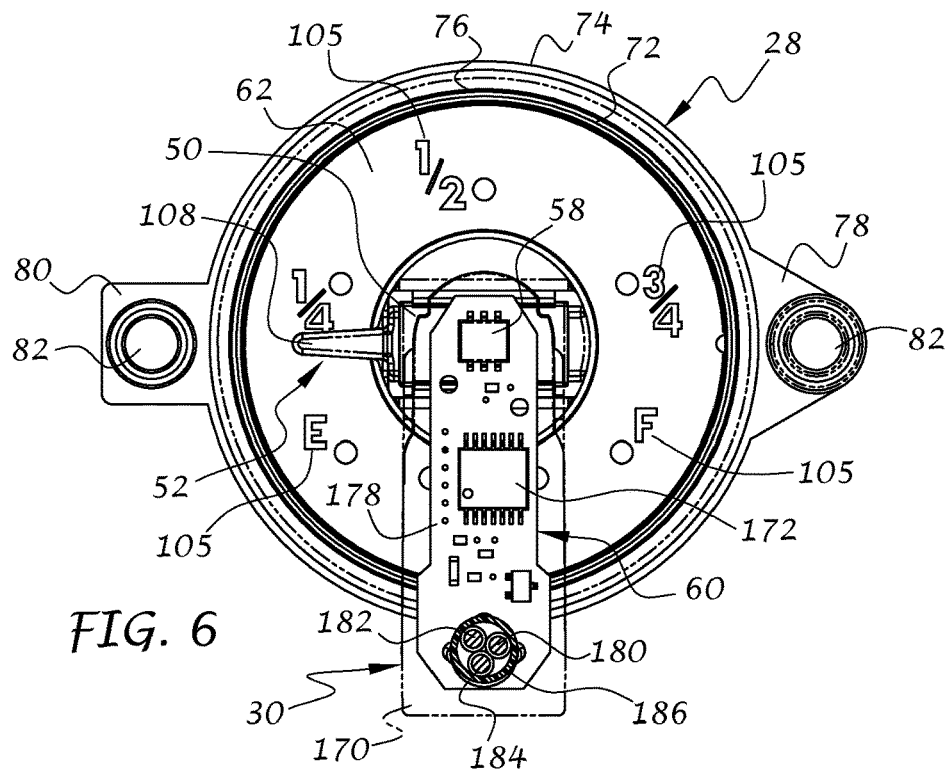
FIG. 6 is a top plan view of the dial assembly and sensor module with portions removed to illustrate alignment of a sensor with an actuator that changes the electronic state of the sensor depending on the rotational position of the actuator with respect to the sensor.
Figure 7:
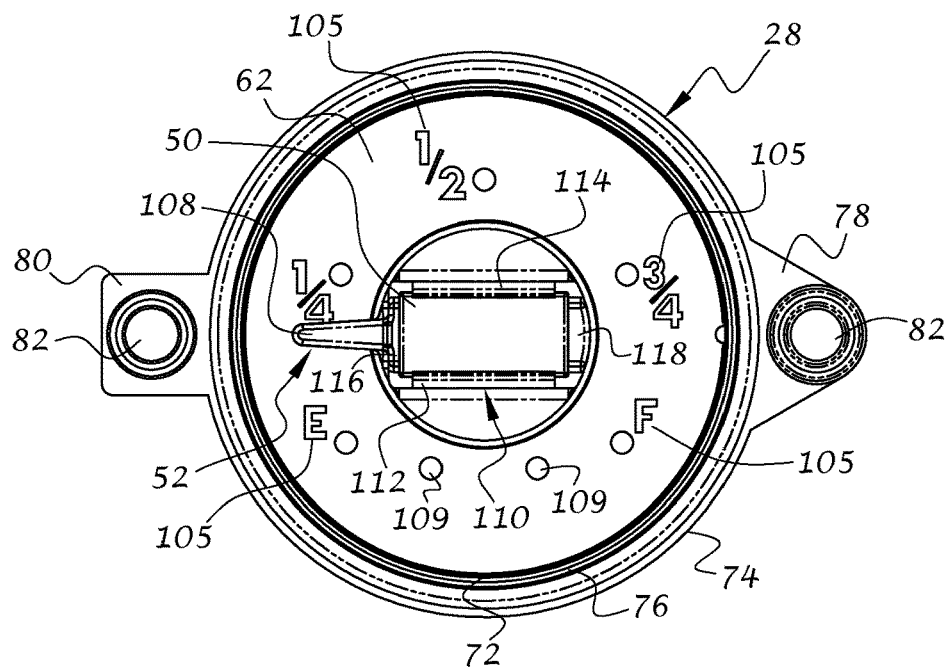
FIG. 7 is a top plan view of the dial assembly with the sensor module removed, to view the actuator in accordance with an exemplary embodiment of the invention.

Referring now to FIGS. 6 and 7, the electronic determination of liquid level can be accomplished by providing an actuator 50 in the center of the dial assembly 28 for rotation about a central axis 54 (FIG. 8) with a pointer assembly 52. The pointer assembly 52 rotates in response to rotation of the drive magnet 46 (FIG. 1) of the sending unit 26 when a change in liquid level occurs, as described above. As shown in FIG. 6, a cover of the dial assembly 28 has been removed for clarity, and a housing 170 of the sensor module has been shown in phantom line, to reveal an electronics assembly 60 which includes a stationary sensor 58, which senses a change in position of the actuator 50 and creates an electronic state unique to the angular position of the actuator. In FIG. 7, the sensor module 30 has been removed for clarity to show the location and orientation of the actuator 50, as will be described in greater detail below. Accordingly, when the electronic state of the sensor 58 changes, a change in liquid level in the tank 12 (FIG. 1) can be determined.

Figure 8:
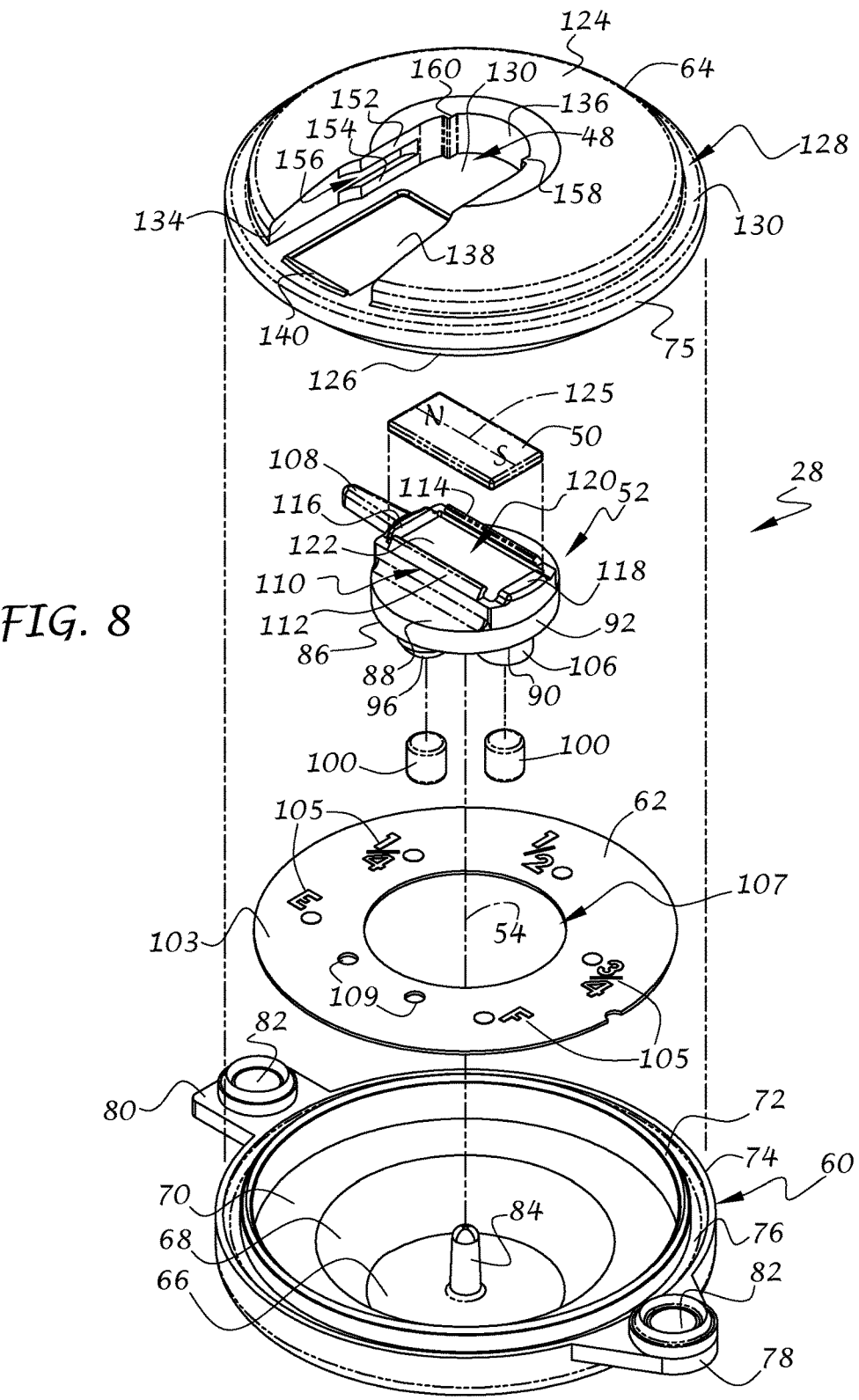
FIG. 8 is a top rear isometric exploded view of the dial assembly in accordance with an exemplary embodiment of the invention.
Figure 9:
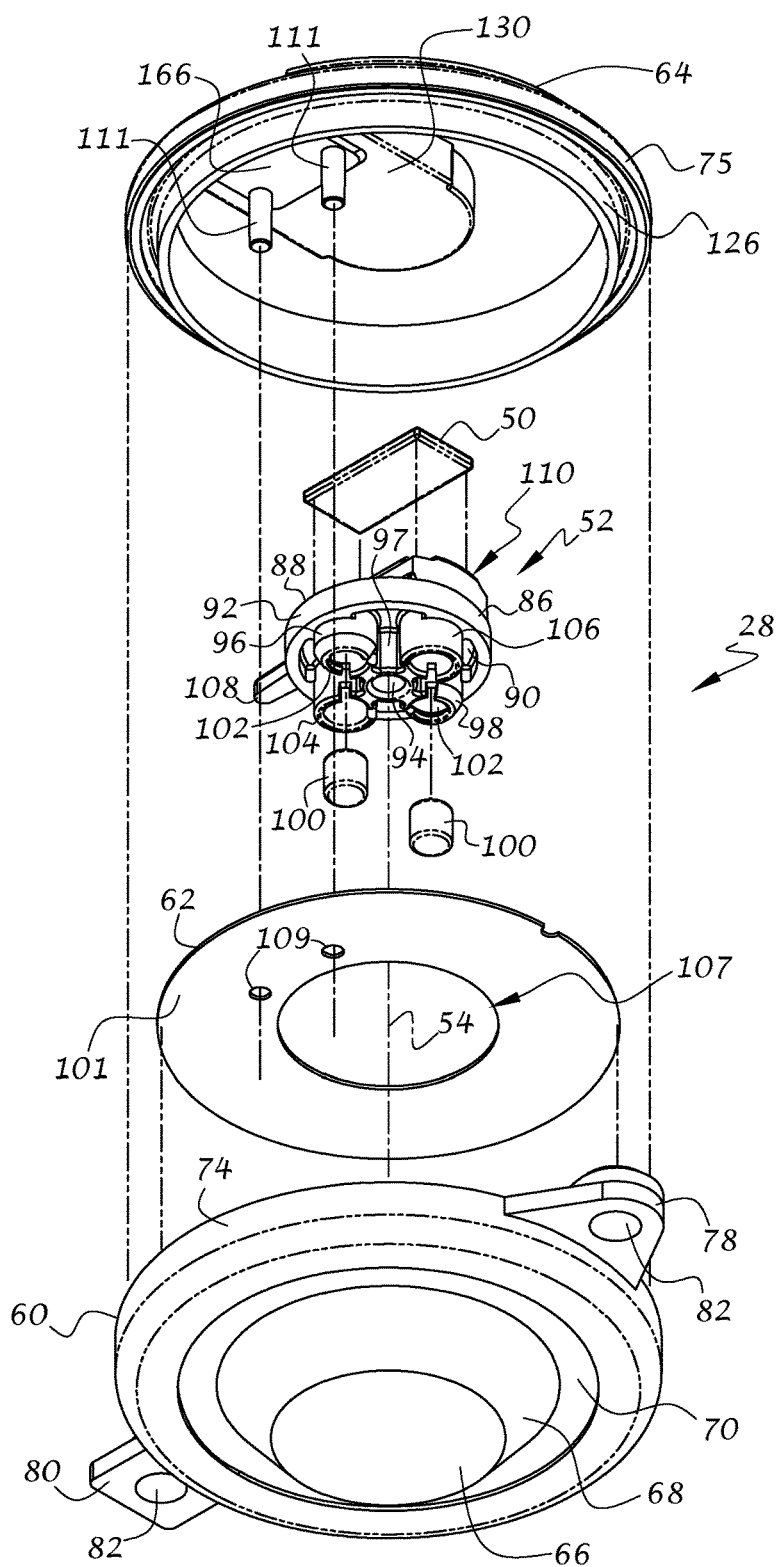
FIG. 9 is a bottom rear isometric exploded view of the dial assembly.
Figure 10:
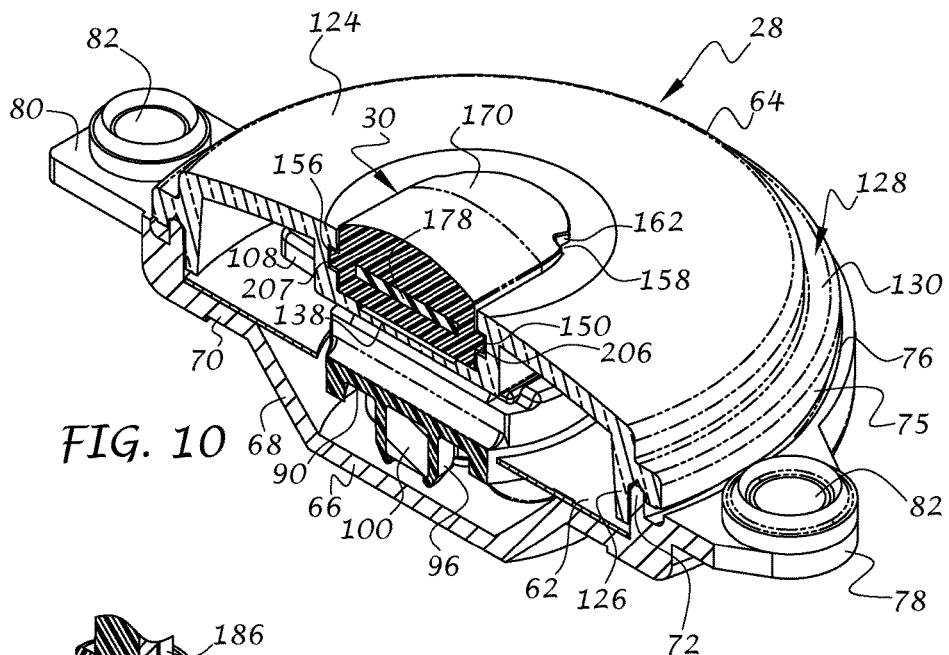
FIG. 10 is a sectional view of the dial assembly and connected sensor module taken along line 10-10 of FIG. 4.

Referring now to FIGS. 8 and 9, the dial assembly 28, in accordance with an exemplary embodiment of the invention, includes a generally circular base 60, a circular scale plate 62 connected to the base 60, a pointer assembly 52 connected for rotational movement with respect to the base and scale plate 62, and a lens or cover 64 connected to the base 60 for isolating the scale plate 62 and pointer assembly 52 from the outside environment.

With reference to FIGS. 8-11, the base 60 is preferably circular in construction and includes a bottom wall 66, a frustro-conical side wall 68 extending upwardly and outwardly from the bottom wall, a support wall 70 that extends generally parallel with the bottom wall and receives the scale plate 62, an inner circular side wall 72 extending upwardly from the support wall 70, and an outer circular side wall 74 spaced from the inner wall 72 to form a groove 76 therebetween for receiving an outer circular wall or flange 75 of the cover 64. Mounting tabs 78 and 80 extend outwardly from the outer wall side wall 74 at diametrically opposite locations thereof. Mounting apertures 82 are formed in the tabs 78 and 80 for receiving mounting hardware, such as threaded screws (not shown), to mount the dial assembly 28 to the mounting head 22 (FIG. 1) of the liquid level gauge 10. However, it will be understood that other embodiments can use alternative fastening means known in the art without departing from the spirit and scope of the invention. A generally conically-shaped pivot pin 84 is located at an axial center of the bottom wall 66 coincident with the rotational axis 54 and extends upwardly therefrom.

Figure 11:
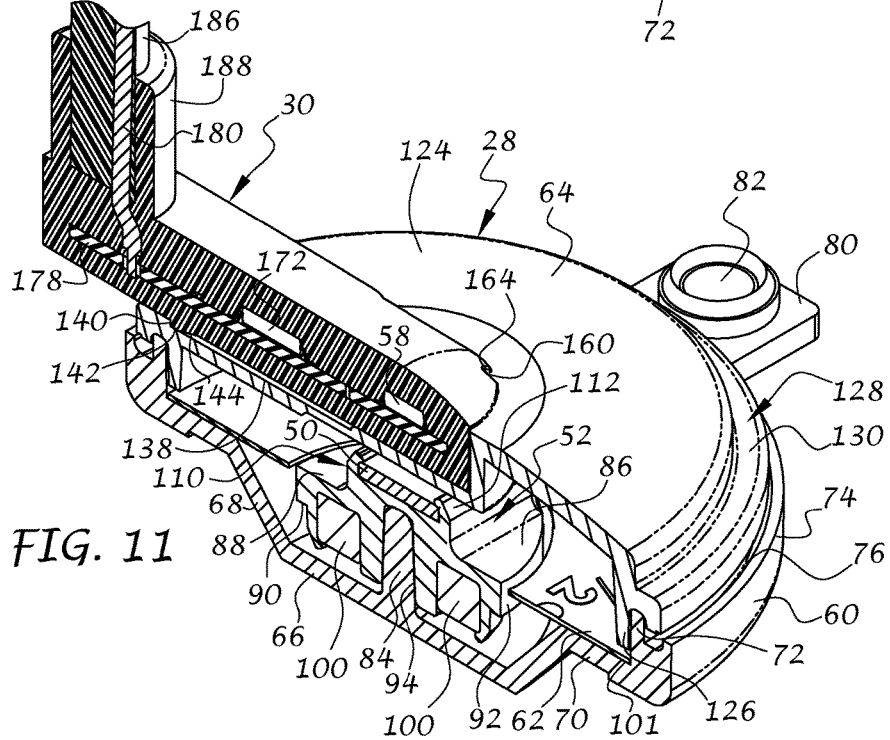
FIG. 11 is a sectional view thereof taken along line 11-11 of FIG. 5.
Figure 12:
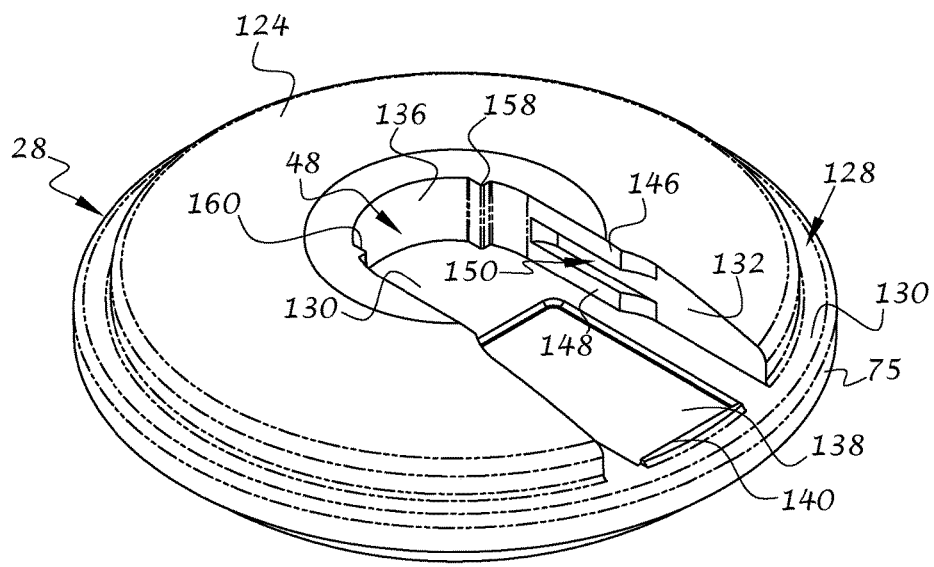
FIG. 12 is a top left rear isometric view of the dial assembly.
Figure 13:
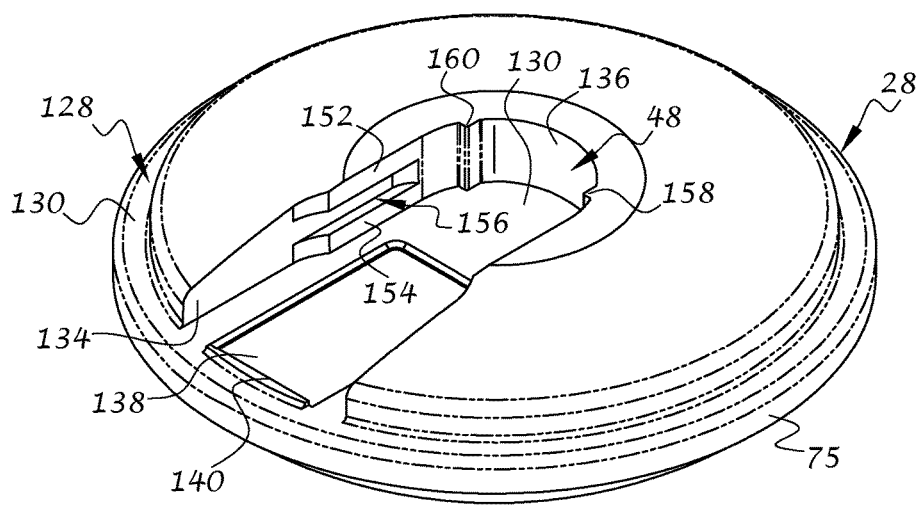
FIG. 13 is a top right rear isometric view thereof.
Figure 14:
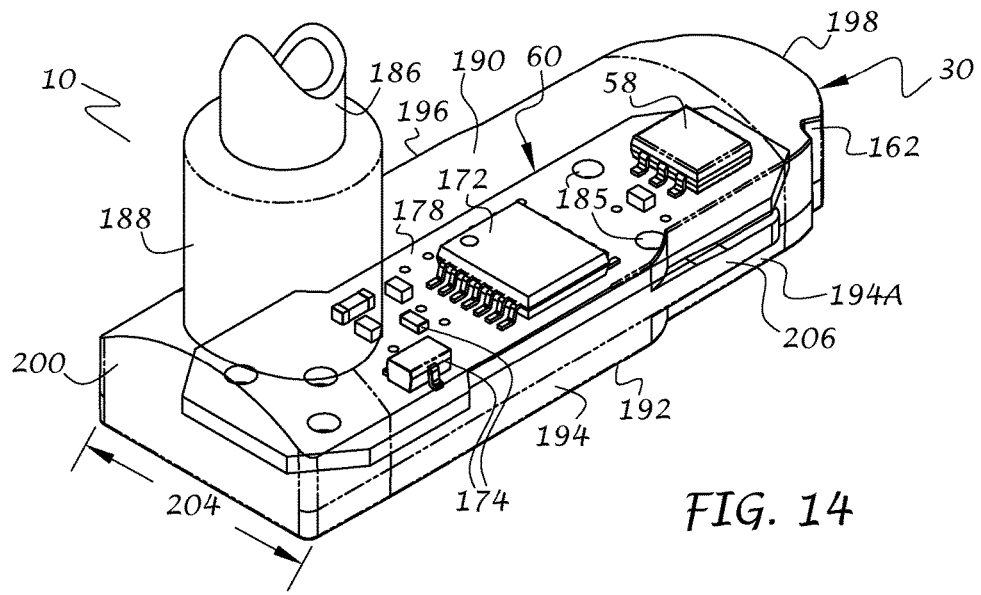
FIG. 14 is a top right rear isometric view of the sensor module in accordance with an exemplary embodiment of the invention, with portions thereof shown as transparent to illustrate the inner sensor board assembly associated therewith.
Figure 15:
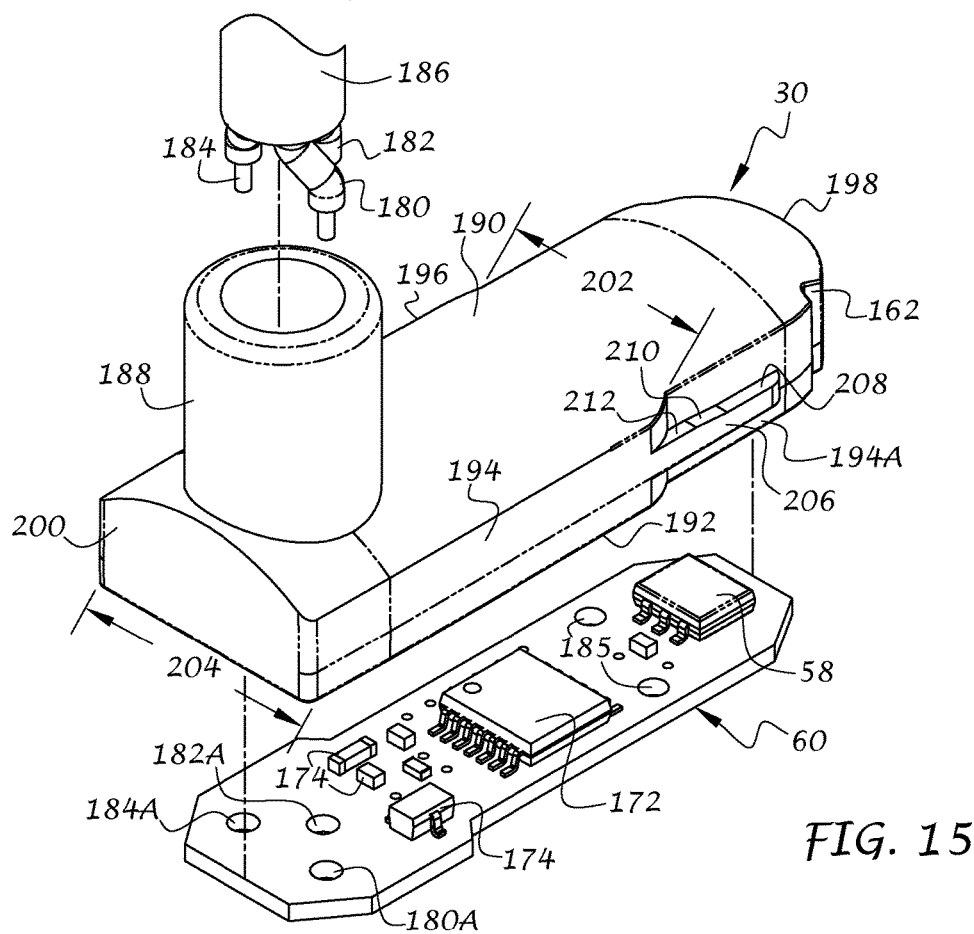
FIG. 15 is a top right rear exploded isometric view thereof.

The pointer assembly 52 includes a generally circular-shaped body or disk 86 with an upper surface 88, a lower surface 90, and a side surface 92 extending therebetween. A central opening 94 (FIG. 9) is formed axially in a central boss 97 that extends downwardly from the lower surface 90. As best shown in FIG. 11, the central opening 94 complements the shape of the pin 84, so that the pointer assembly rotates with little or no play around the rotational axis 54 when the pin 84 is located in the central opening 88. Rotation of the pointer assembly is preferably limited in both the clockwise and counter-clockwise directions about the rotational axis 54. The body 86 and pin 84 can be constructed of low friction material and/or lubricated to allow the body 86 to effortlessly rotate on the pin 84. It will be understood that other well-known means for rotatably connecting the disk 86 to the base 60 can be used.

A first pair of diametrically spaced bosses 96 and 98 extend downwardly from the lower surface 90. A cylindrically-shaped driven magnet 100 is located in a bore 102 formed in each boss 96, 98. The ends of each boss 96, 98 can be crimped, staked, or otherwise deformed once the magnets 100 are installed, as shown for example in FIGS. 9-11, to hold the magnets in place. A second pair of diametrically spaced bosses 104 and 106 also extend downwardly from the lower surface 80 and each includes a bore 102 for receiving an additional magnet (not shown), potting material, or the like, so that the body 86 is balanced about the pivot pin 84. The driven magnets 100 are magnetically coupled to the drive magnet 46 associated with the drive shaft 42 (FIG. 1) of the liquid level gauge 10, and thus serve to cause corresponding rotation of the pointer assembly 52 with respect to the scale plate 62 (FIG. 8) when the float 32 is moved in response to a change in level 15 of liquid 16 within the tank 12 (FIG. 1).

Although the circular-shaped body or disk 86 has been shown as rotatably connected to the base, the disk can alternatively or additionally be rotatably connected to the lens or other structure without departing from the spirit and scope of the invention.

A pointer 108 is preferably formed integral with the body 86 and extends radially outwardly from the side surface 92 for visually indicating a liquid level condition in conjunction with the scale disk 62. Although shown as somewhat triangular in shape, it will be understood that the pointer 108 can be of any suitable shape for indicating a liquid level condition.

The scale disk 62 is formed of a thin plate material and is annular in shape and includes a bottom surface 101 (FIG. 9) that faces the support wall 70 of the base 60 and is supported thereon, a top surface 103 (FIG. 8) with indicia 105 thereon indicative of the liquid level condition within the tank, and a central opening 107 that is sized to receive the circular body 86. The scale disk 62 is fixed with respect to the base 60 so that the pointer 108 rotates with respect to the scale disk 62 to visually indicate liquid level by an observer. Apertures 109 are formed in the scale disk 62 for receiving posts 111 (FIG. 9) associated with the cover 64 for holding the scale disk 62 against rotation. The posts 111 also serve as stop members that engage the pointer 108 to limit the angular rotation of the pointer assembly 52 between approximately empty and full conditions of the tank.

An actuator cradle 110 extends upwardly from the upper surface 88 of the body 86 and includes spaced side walls 112 and 114, a front wall 116, a rear wall 118 spaced from the front wall, and a bottom surface 122 extending between the side walls and the front and rear walls to form a generally rectangular-shaped space 120 for receiving an actuator 50. The cradle is preferably formed integrally with the body 86, but may be formed separately and connected to the body through well-known connection means. Preferably, the actuator 50 is also generally rectangular in shape and is sized to fit within the space 120. The actuator 50 is supported by the bottom surface 122 and can be retained in the space 120 by bending or crimping the side walls 112 and 114 slightly over the actuator 50 so that the actuator is sandwiched between the walls 112, 114 and the bottom surface 122. It will be understood that the actuator 110 can be connected to the body or disk 86 for rotation therewith using other connection means, such as adhesive bonding, press-fitting, mechanical fastening with brackets, threaded fasteners, hook and loop materials, and so on, without departing from the spirit and scope of the invention.

With this construction, the actuator 50 rotates with the pointer assembly 52 to change the electronic state of the stationary sensor 58 (FIG. 6) of the sensor module 30 proportional to an angular position of the actuator 50 to thereby determine a change in liquid level 15 (FIG. 1) in the tank 12.

In accordance with a preferred embodiment of the invention, the actuator 50 comprises a bar magnet with a north-south axis 125 (FIG. 8) preferably oriented along the length of the magnet 50, i.e. between its short sides so that the axis 125 is in alignment with the pointer 108. However, it will be understood that the north-south axis 125 can be oriented along the width of the magnet, i.e. between its long sides, between opposite corners, or along the thickness thereof, without departing from the spirit and scope of the invention. The actuator magnet 50 can be a free-standing device when the cradle 110 and body 86 are constructed of non-magnetic material, such as aluminum, brass, plastic, composites, ceramics, and so on. When at least the cradle 110 is constructed of magnetically permeable material, the magnet can be in the form of a pot magnet, which directs the lines of magnetic flux through the cradle material. It will be understood that the actuator 50 is not limited to the particular shape as shown and described, but may be circular, square, or of any other shape that causes a change in orientation of the north-south axis or equivalents thereof when rotated or otherwise moved in response to a particular level of liquid within the tank.

Preferably, the stationary sensor 58 comprises a magnetic field sensor positioned at a center section of the bar magnet along the north-south axis 125 (FIG. 8) or other location where changes in magnetic flux are more pronounced. The stationary field sensor 58 comprises a Hall-effect sensor, and more preferably an integrated circuit (IC) magnetic field sensor chip that comprises pairs of Hall-effect sensors located at 90 degrees with respect to each other, e.g. along X and Y axes (not shown). In this manner, the magnetic angle of the north-south axis relative to the chip sensor can be measured and correlated with liquid level independent of magnetic field strength. One suitable sensor 58 can include part No. EM3242 by Asahi of Tokyo, Japan. This IC device includes a pair of Hall-effect sensors oriented in the X direction and a pair of similar sensors oriented in the Y direction, a preamplifier, angle detection processing circuitry for detecting the angle of the north-south axis of the magnet, and a digital to analog converter (DAC) for providing analog output proportional to the angular orientation of the north-south axis.

Although a particular magnetic sensor has been described with respect to this embodiment, it will be understood that other magnetic sensing devices can be used without departing from the spirit and scope of the invention. For example, other devices can include, but are not limited to, one or more solid state magnetic flux field sensors, the afore-mentioned Hall effect sensors, magnetoresistive (MR) sensors, anisotropic MR (AMR) sensors, giant magnetoresistance (GMR) sensors, solid state Micro-Electro-Mechanical Systems (MEMS), magnetic switches, or other devices or sensors for measuring the angle of the north-south axis or for otherwise determining a change in the angular orientation of the magnetic field of the actuator 50. With the use of one or more of the above sensors, it may not be necessary to have the sensor in alignment with the linear north-south axis of the magnet.

Moreover, in accordance with a further embodiment of the invention, nonmagnetic sensing technologies such as proximity detectors using capacitance, optical, or other measurement technologies, and so on, can be used in conjunction with related structure associated with the dial assembly 28. For example, the actuator can be in the form of one or more magnets, LED's, optical fibers or other light source, or other contactless actuator/sensor arrangements to remotely change the electrical state of the sensor. In the event that optical sensors are used, the cover 64 can be formed of a material that is translucent or transparent to the wavelength of the light source so that the sensor elements can readily detect movement of the light source as the liquid level in the container rises and falls.

With the above-described arrangement, the pointer assembly 52 can be used with a variable thickness magnet of the prior art as discussed with respect to U.S. Pat. No. 5,564,632 discussed above, which varies in magnetic field strength proportional to the thickness of the magnet. Since such variable thickness magnets also have a north-south axis, the stationary sensor 58 can determine the angular position of such magnets independent of magnetic field strength. However, the prior art pointer with single Hall-effect sensor, such as disclosed in the above-referenced '632 patent, cannot be used with the magnetic actuator 50 of the present invention, since the magnetic field strength of the actuator 50 does not change in a consistent, measureable amount.

In order to allow the sensor module 30 of the present invention to be installed in both the liquid level gauge 10 of the present invention and prior art gauges as referenced in the '632 patent above, and create or generate an electrical signal indicative of liquid level for both the liquid level gauge 10 of the invention and the prior art liquid level gauges as disclosed in the '632 patent, and at the same time prevent unauthorized sensor modules, such as referenced in the '632 patent, from being installed in the liquid level gauge 10 of the present invention, as the Hall-effect sensor of the unauthorized sensor module does not detect the angle of the north-south axis of the actuator 50, and therefore will not work with the liquid level gauge 10, cooperating features associated with the sensor module 30 and the dial assembly 28 of the present invention are provided, such features also allowing the sensor module 30 to be installed in the prior art liquid level gauge such as referenced in the '632 patent to generate electrical signals indicative of liquid level in the tank, as will be described in greater detail below.

With particular reference to FIGS. 8-13, the cover 64 preferably includes an upper wall 124 that has a generally convex shape, an inner circular side wall 126 extending downwardly from the upper wall 124, an annular depression 128 extending around the periphery of the upper wall 124 and defining a bottom wall 130 from which the outer circular wall or flange 75 extends. As described above, the outer circular wall 75 is received in the annular groove 76 (FIG. 8) of the base 60 when assembled. Likewise, the inner circular side wall 126 is juxtaposed with the inner circular side wall 72 (see FIGS. 10 and 11) of the base 50 when assembled and can be connected together through any well-known means such as adhesive bonding, heat welding, mechanical fastening, mutually engageable threads, friction fit, and so on.

A channel 48 that complements the shape of the sensor module 30 is formed in the cover 64 and includes a right side surface 132 (FIG. 12), a left side surface 134 (FIG. 13), and a generally concave front surface 136 extending between the bottom wall 130 and the upper wall 124 and between the right and left side surfaces 132 and 134, respectively. A depression 138 is formed in the bottom wall 130 within the channel 48 and includes a locking edge 140 that engages with a locking protrusion 142 (FIGS. 11 and 20) of the sensor module 30 when installed in the channel 48. The locking protrusion 142 of the sensor module 30 includes a ramped surface portion 144 to facilitate insertion of the locking protrusion 142 of the sensor module 30 into the depression 138. A first pair of elongate guides 146 and 148 (FIG. 12) extend laterally into the channel 48 from the right side surface 132 to form a first elongate gap 150 therebetween. Likewise, a second pair of elongate guides 152 and 154 (FIG. 13) extend laterally into the channel 48 from the left side surface 134 to form a second elongate gap 156 therebetween. The purpose of the first and second gaps will be described in greater detail below.

A first upright go-no-go protrusion 158 is formed at an intersection between the right side surface 132 and the front surface 136, while a second upright go-no-go protrusion 160 is formed at an intersection between the left side surface 134 and the front surface 136. The go-no-go protrusions 158 and 160 are shown as generally triangular in shape, but can be formed of various other shapes without departing from the spirit and scope of the invention. The go-no-go protrusions 158 and 160 work together with complementary first and second go-not-go cavities 162 and 164 (FIGS. 16 and 17), respectively, formed in the sensor module 30, as will be described in greater detail below, to ensure that the sensor module 30 can be inserted into the channel 48 and locked in place with the locking protrusion 142 of the sensor module 30 seated against the locking edge 140 of the cover 64. Conversely, the upright go-no-go protrusions 158 and 160 ensure that unauthorized sensor modules, such as discussed above, cannot be installed in the channel 48 of the cover 64 and locked in position, thereby preventing false or incorrect readings from unauthorized sensor modules.

It will be understood that the first and second go-no-go protrusions are given by way of example only, and can vary from one protrusion to multiple protrusions. It will be further understood that the one or more protrusions can have other shapes or configurations and can extend in other directions besides upright, such as laterally, radially, at an angle with respect to the bottom wall 130, front surface 136 and/or side surfaces 132 and 134, and so on, so long as the sensor module 30 has one or more complementary-shaped features to allow insertion of the sensor module 30 into the channel 48 sufficiently to be locked into position while preventing unauthorized sensor modules from being inserted into the channel 48 in a locked in position.

As shown most clearly in FIG. 9, the posts 111 extend downwardly from a lower wall 166 of the depression 138 adjacent to the bottom wall 130. The posts 111 extend through the apertures 109, as previously described, to act as stop members for limiting the rotation of the pointer assembly 52 while properly orienting the scale plate 62 with respect to the central axis 54 so that the indicia 105 indicative of liquid level condition within the tank are properly aligned with respect to the cover 64 and the pointer 108 during assembly. The cover 64 can be constructed of any suitable transparent or translucent material which allows the observer to view the indicia 105 on the scale plate 62 through the upper wall 124. It will be understood that the term "transparent" as used herein does not necessarily refer to completely transparent but rather denotes sufficient transparency to allow an observer to visually determine a position of the pointer 108 with respect to the indicia 105.

In accordance with a further embodiment of the invention, the cover 64 can be constructed of opaque material and the pointer 108, scale plate 62, and related structure, can be removed when only electronic signals related to the liquid level condition in the tank are needed, such as when the dial assembly is mounted at a location where it may be difficult to directly view the pointer and indicia by an observer.

Referring now to FIGS. 14-20, the sensor module 30 preferably includes an electronics assembly 60 located within a housing 170. The housing 170 is complementary in shape to the channel 48 formed in the cover 64. Preferably, the housing is formed around the electronics assembly 60 so that the electronics, including the sensor 58 previously described, are embedded within the housing and protected from the outside environment.

The electronics assembly 60 can include the sensor 58 as previously described, along with a processor 172, a temperature sensor 174, and other passive and/or active electronic components 176 mounted on a printed circuit board (PCB) 178 for providing power to the sensor 58 and receiving electronic signals therefrom indicative of the north-south axis 125 (FIG. 8) of the actuator magnet 50. Electrical wires 180, 182, and 184 (FIG. 15) are electrically and mechanically connected to the PCB 178 via through-holes 180A, 182A, and 184A, respectively, and extend therefrom for providing power and ground to the electronic components from an outside power source, and analog and/or digital signal output of the liquid level condition within the tank, so that the tank condition can be indicated remotely on a display, illuminated bargraph, one or more sound producing devices, and/or other means for communicating the liquid level within the tank. The wires are surrounded by a protective sheath 186 which is in turn surrounded by a cylindrical portion 188 of the housing 170. As previously described, the sensor 58 senses a change in position of the north-south axis 125 (FIG. 8) of the actuator magnet 50 and creates an electronic signal unique to the angular position of the actuator. Accordingly, when the electronic state of the sensor 58 changes, a change in liquid level in the tank 12 (FIG. 1) can be determined and remotely communicated without the need to directly view the gauge by an observer.

The housing 170 of the sensor module 30 is preferably formed through overmolding or similar manufacturing techniques to completely surround over the electronics assembly 60 including the PCB 178 and wires 180, 182, and 184. Enlarged thru-holes 185 (FIG. 15) can be formed in the PCB 178 so that the overmolding material can flow around and through the PCB to thereby secure the housing 170 thereto. In this manner, the electronics assembly 60 is completely isolated from the environment and has no moving parts, thereby creating a very robust sensor module.

The housing 170 preferably includes an upper surface 190 that has a generally convex shape, a lower surface 192 that is generally flat, with the locking protrusion 142 and ramped surface portion 144 (FIG. 20) extending downwardly therefrom, a first right side surface 194 that converges toward a second right side surface 194A (FIGS. 14-16), and a first left side surface 196 that converges toward a second left side surface 196A (FIG. 17). The first and second left and right side surfaces extend between the upper surface 190 and the lower surface 192. A front surface 198 of the housing 170 extends between the second right side surface 194A and second left side surface 196A and between the upper surface 190 and lower surface 192. Likewise, a rear surface 200 extends between the first right side surface 194 and the first left side surface 196. The second right and left side surfaces define a relatively narrow forward section 202 that is received in the channel 48 (FIG. 3) of the cap 64 when the sensor module 30 is inserted into the channel 48. Likewise, the first right and left side surfaces define a relatively wide rearward section 204 that extends rearwardly from the channel 48 when the sensor module 30 is installed therein.

A first elongate ledge or finger 206 extends laterally outwardly from the second right side surface 194A and a second elongate ledge or finger 207 extends laterally outwardly from the second left side surface 196A. Each elongate ledge 206, 207 includes a first section 208 (best shown in FIG. 15) having a first thickness, a second section 210 having a second thickness, and a third section 212 having a third thickness. Preferably, the third thickness is greater than the second thickness which is greater than the first thickness so that the first elongate ledge 206 can be received into the first elongate gap 150 (FIGS. 10 and 12) and the second elongate ledge 207 can be received into the second elongate gap 156 (FIG. 13) with increasing frictional engagement between the first elongate ledge 206 and the first pair of elongate guides 146 and 148, respectively, and the second elongate ledge 207 and the second pair of elongate guides 152 and 154, respectively, as the sensor module 30 is pushed further into the channel 48 during installation of the sensor module into the dial assembly 28 to ensure a positive snap-fit engagement between the locking protrusion 142 and the locking edge 140 (FIG. 11), as well as a snug fit between the sensor module 30 and dial assembly 28. In this manner, vibration or other relative movement between the sensor module 30 and the dial assembly 28 is substantially reduced or eliminated, especially where the present invention is installed on motorized machinery, equipment, or vehicles. The ramped surface portion 144 of the locking protrusion 142 facilitates insertion of the locking protrusion 142 into the depression 138 and prevents inadvertent separation of the dial assembly 28 and sensor module 30 during use.

In order to remove the sensor module 30 from the dial assembly 28, the rear section 204 of the sensor module is lifted slightly until the locking protrusion 42 clears the locking edge 140 (FIG. 11) and then slid out of the cover 64.

The first go-no-go cavity 162 is formed at an intersection between the front surface 198 and the second right side surface 194A. Likewise, the second go-no-go cavity 164 is formed at an intersection between the front surface 198 and the second left side surface 196A. The first and second cavities preferably complement the shape(s) of the first and second go-no-go protrusions 158 and 160, respectively, so that the protrusions are received in their respective cavities to allow full insertion and snap-fit locking of the sensor module with respect to the dial assembly 28 with the locking protrusion 142 of the sensor module 30 seated against the locking edge 140 of the cover 64. Conversely, the upright go-no-go protrusions 158 and 160 ensure that unauthorized sensor modules, such as discussed above, cannot be installed in the channel 48 of the cover 64 and locked in position, thereby preventing the installation of, and thus the consequent false or incorrect readings from, unauthorized sensor modules.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

Moreover, the term "generally" as used throughout the specification includes features that range from approximately to completely. For example, the phrase "generally circular" can range from approximately to predominantly to completely circular, depending on the features, manufacturing tolerances, and other disruptions that may occur in the design, manufacture, assembly, etc., that may interrupt the circular nature of the feature and/or component being described.

It will be appreciated by those skilled in the art that changes could be made to the embodiments described above without departing from the broad inventive concept thereof. Although the present invention has been described in conjunction with LPG and similar tanks, it will be understood that other tank types and/or shapes can be used, and that the level of other liquids can be detected and displayed in a similar manner. Moreover, it will be appreciated that the exemplary embodiments of the invention are not limited to the particular shapes or configurations as shown and described, such as circular, curved, convex, and so on, but can greatly vary without departing from the spirit and scope of the invention. By way of example, the cover, base, and other components are described as generally circular in shape, but can be square, rectangular, triangular, octagonal, and/or any other suitable shape so long as one or more of the described functions can be performed. It will be understood, therefore, that this invention is not limited to the particular embodiments disclosed, but it is intended to cover modifications within the spirit and scope of the present invention as defined by the appended claims.

What is claimed is:

1. An indicator assembly for determining a liquid level condition within a tank, the indicator assembly comprising:
    a dial assembly adapted for connection to the tank, the dial assembly including:
        a base;
        a cover connected to the base, the cover having a channel and at least one go-no-go protrusion projecting into the channel for engaging an unauthorized sensor module during installation thereof in the channel to thereby prevent movement of the unauthorized sensor module to a fully seated position in the cover; and
    an actuator located between the base and the cover, the actuator being movable in response to a change in the liquid level condition in the tank; and
    an authorized sensor module capable of being moved to the fully seated position in the cover, the authorized sensor module including:
        a housing;
        at least one sensor located in the housing for determining movement of the actuator from one position to another in response to a change in liquid level within the tank; and
        at least one go-no-go cavity formed in the housing, the at least one go-no-go cavity being shaped to prevent interference with the at least one go-no-go protrusion projecting into the channel, so that the authorized sensor module can be moved to the fully seated position in the cover such that the at least one sensor is aligned with the actuator for generating signals related to the liquid level condition;
    wherein the unauthorized sensor module is not capable of being moved to the fully seated position in the cover due to the absence of the at least one go-no-go cavity in the unauthorized sensor module causing the at least one go-no-go protuberance to interfere with movement of the unauthorized sensor module toward the fully seated position, thereby preventing alignment of the unauthorized sensor module with the at least one sensor and thus preventing the unauthorized sensor module from sending incorrect signals related to the liquid level condition.

2. An indicator assembly according to claim 1, wherein the dial assembly comprises a pair of spaced go-no-go protrusions and the sensor module comprises a pair of spaced go-no-go cavities coincident with the pair of spaced go-no-go protrusions, with each go-no-go cavity having sufficient clearance around its respective go-no-go cavity to thereby permit the authorized sensor module to be moved to the fully seated position in the cover.

3. An indicator assembly according to claim 2, wherein the actuator rotates about a central axis in response to a change in the liquid level condition in the tank.

4. An indicator assembly according to claim 1, wherein the at least one sensor comprises a first sensor and a second sensor oriented approximately 90 degrees with respect to each other for detecting rotation of the actuator about the central axis and determining the liquid level condition within the tank.

5. An indicator assembly according to claim 4, wherein the actuator comprises a magnet with a north-south axis, a rotational position of which is detected by the first and second sensors for determining the liquid level condition within the tank.

6. An indicator assembly according to claim 5, wherein the first and second sensors comprise Hall-effect sensors.

7. An indicator assembly according to claim 4, wherein the actuator comprises a magnet with a north-south axis, a rotational position of which is detected by the first and second sensors for determining the liquid level condition within the tank.

8. An indicator assembly according to claim 1, wherein the at least one go-no-go protrusion extends in an axial direction from a bottom wall of the channel to a top wall of the cover, and the at least one go-no-go cavity extends in an axial direction between a lower surface and an upper surface of the housing.

9. An indicator assembly according to claim 1, wherein the channel further comprises:
    a right side surface;
    a left side surface spaced from the right side surface;
    a front surface extending between the right and left side surfaces; and
    a lower surface extending between the right and left side surfaces and extending from the front surface;
    wherein the at least one go-no-go protrusion projecting into the channel comprises first and second go-no-go protrusions, with the first go-no-go protrusion located at an intersection between the right side surface and the front surface, and the second go-no-go protrusion located at an intersection between the left side surface and the front surface.

10. An indicator assembly according to claim 9, wherein the housing further comprises:
    a right side surface;
    a left side surface;
    a front surface extending between the right and left side surfaces of the housing; and a bottom surface extending between the right and left side surfaces and extending from the front surface of the housing;

wherein the at least one go-no-go cavity comprises first and second go-no-go cavities with the first go-no-go cavity located at an intersection between the first side surface and the front surface of the housing, and the second go-no-go cavity located at an intersection between the left side surface and the front surface of the housing for mating with the first and second go-no-go protrusions, respectively.

11. An indicator assembly according to claim 10, wherein the housing further comprises a locking protrusion extending downwardly from the lower surface of the housing and the channel further comprises a depression formed in the lower surface of the channel with a rearward locking edge that engages the locking protrusion when the sensor module is inserted fully into in the channel into the fully seated position with the first and second go-no-go cavities in mating relationship with the first and second go-no-go protrusions, respectively, to thereby removably retain the sensor module within the channel in a snap-fit engagement.

12. An indicator assembly according to claim 1, and further comprising:
    a pivot pin located on a bottom wall of the base and extending upwardly and defining a rotational axis;
    a pointer assembly including:
        a scale plate with indicia thereon for indicating liquid level;
        a body with a central opening formed axially therein for receiving the pivot pin so that the body rotates about the rotational axis, the body having a pointer aligned with the indicia for visually indicating the liquid level condition;
        a first pair of diametrically spaced bosses extending downwardly from a lower surface of the body;
        a driven magnet located in each boss;
        wherein outer ends of the bosses are deformed to hold the driven magnets in place, the driven magnets being magnetically couplable to a drive magnet associated with a drive shaft of a liquid level sending unit, so that the body rotates upon rotation of the drive shaft to cause corresponding rotation of the pointer with respect to the scale plate in response to a change in the liquid level condition of the tank.

13. An indicator assembly according to claim 12, and further comprising a cradle located on the body for receiving and holding the actuator such that the actuator rotates about the rotational axis with the body.

14. An indicator assembly according to claim 13, wherein the at least one sensor comprises a first sensor and a second sensor oriented approximately 90 degrees with respect to each other for detecting rotation of the actuator about the central axis and determining the liquid level condition within the tank.

15. An indicator assembly for determining a liquid level condition within a tank, the indicator assembly comprising:
    a dial assembly adapted for connection to the tank, the dial assembly including:
        a base;
        a cover connected to the base, the cover having a channel and at least one go-no-go protrusion projecting into the channel, the channel including a right side surface; a left side surface spaced from the right side surface; a front surface extending between the right and left side surfaces; and a lower surface extending between the right and left side surfaces and extending from the front surface; and
        an actuator located between the base and the cover, the actuator being movable in response to a change in the liquid level condition in the tank; and
    a sensor module adapted for insertion into the channel, the sensor module including:
        a housing having a right side surface; a left side surface; a front surface extending between the right and left side surfaces of the housing; and a bottom surface extending between the right and left side surfaces and extending from the front surface of the housing;
        at least one sensor located in the housing for determining movement of the actuator from one position to another in response to a change in liquid level within the tank; and
        at least one go-no-go cavity formed in the housing, the at least one go-no-go cavity being complementary in shape with the at least one go-no-go protrusion so that the sensor module can be fully inserted in the housing with the at least one sensor aligned with the actuator for generating signals related to the liquid level condition;
        wherein an unauthorized sensor module is not capable of being fully inserted into the housing due to the at least one go-no-go protuberance and the absence of the at least one go-no-go cavity in the unauthorized sensor module to thereby prevent the unauthorized sensor module from sending incorrect signals related to the liquid level condition;
    the at least one go-no-go protrusion projecting into the channel comprises first and second go-no-go protrusions, with the first go-no-go protrusion located at an intersection between the right side surface and the front surface, and the second go-no-go protrusion located at an intersection between the left side surface and the front surface;
    wherein the at least one go-no-go cavity comprises first and second go-no-go cavities with the first go-no-go cavity located at an intersection between the first side surface and the front surface of the housing, and the second go-no-go cavity located at an intersection between the left side surface and the front surface of the housing for mating with the first and second go-no-go protrusions, respectively;
    wherein the housing further comprises a locking protrusion extending downwardly from the lower surface of the housing and the channel further comprises a depression formed in the lower surface of the channel with a rearward locking edge that engages the locking protrusion when the sensor module is inserted fully into the channel with the first and second go-no-go cavities in mating relationship with the first and second go-no-go protrusions, respectively, to thereby removably retain the sensor module within the channel in a snap-fit engagement;
    a first pair of elongate guides extending laterally into the channel from the right side surface of the channel to form a first elongate gap between the first pair of elongate guides;
    a second pair of elongate guides extend laterally into the channel from the left side surface of the channel to form a second elongate gap between the second pair of elongate guides;
    a first elongate ledge extending laterally outwardly from the right side surface of the housing; and a second elongate ledge extending laterally outwardly from the left side surface of the housing;

wherein each elongate ledge increases in thickness from a forward end thereof so that the first and second elongate ledges can be received into the first and second elongate gaps, respectively, with increasing frictional engagement between the first and second elongate ledges and the first and second elongate gaps, respectively, the sensor module is pushed further into the channel during installation of the sensor module into the channel to ensure at least one of a positive snap-fit engagement between the locking protrusion and the locking edge and a snug fit between the sensor module and the channel.

* * * * *